(12) United States Patent
Rao et al.

(10) Patent No.: US 11,890,149 B2
(45) Date of Patent: Feb. 6, 2024

(54) MEDICAL DENTAL GRINDING APPARATUS

(71) Applicant: WUXI INSTITUTE OF TECHNOLOGY, Wuxi (CN)

(72) Inventors: Chengming Rao, Wuxi (CN); Qiang Ding, Wuxi (CN); Conggui Huang, Wuxi (CN); Huabin Mei, Wuxi (CN); Ping Cui, Wuxi (CN); Jun Wang, Wuxi (CN); Ming Jiang, Wuxi (CN)

(73) Assignee: WUXI INSTITUTE OF TECHNOLOGY, Wuxi (CN)

( * ) Notice: Subject to any disclaimer, the term of this patent is extended or adjusted under 35 U.S.C. 154(b) by 547 days.

(21) Appl. No.: 17/204,544

(22) Filed: Mar. 17, 2021

(65) Prior Publication Data
US 2021/0205047 A1     Jul. 8, 2021

Related U.S. Application Data

(63) Continuation-in-part of application No. PCT/CN2020/109905, filed on Aug. 19, 2020.

(30) Foreign Application Priority Data

Nov. 27, 2019   (CN) .......................... 201911181473.5

(51) Int. Cl.
*A61C 1/00*     (2006.01)
*A61C 1/05*     (2006.01)
*A61C 1/14*     (2006.01)

(52) U.S. Cl.
CPC .............. *A61C 1/052* (2013.01); *A61C 1/145* (2013.01)

(58) Field of Classification Search
CPC .... A61C 1/02; A61C 1/06; A61C 1/05; A61C 1/052; A61C 1/145; A61C 17/16; A61C 7/02; A61C 8/0089; B24B 1/00; B24B 19/00; B24B 23/00; B24D 15/00; A61B 17/32002; A61B 17/320758; A61B 17/320092; A61B 2017/320024;
(Continued)

(56) References Cited

U.S. PATENT DOCUMENTS 2,044,823 A * 6/1936 Whiteside ................ A61C 1/06
                                                              433/131
2,643,456 A * 6/1953 Maurer ..................... A61C 3/06
                                                              451/75
(Continued)

*Primary Examiner* — Jan Christopher L Merene
*Assistant Examiner* — Kylie M. Gaspar
(74) *Attorney, Agent, or Firm* — CBM PATENT CONSULTING, LLC

(57) ABSTRACT

A medical dental grinding apparatus comprises an apparatus body, wherein an air pipeline, a clamping mechanism, and a grinding mechanism are provided in the apparatus body; the air pipeline includes an air inlet pipeline, an air outlet pipeline, and a U-shaped connection pipeline; a silencer is connected to an upper port of the air outlet pipeline; a plane where the air pipeline is located is perpendicular to a plane where the clamping mechanism is located, and the grinding mechanism is provided below the air pipeline; the grinding mechanism is driven by high-pressure air in the air pipeline to operate, so that a hidden danger of electric leakage caused by using an electric apparatus in a fragile oral environment is avoided; and a steel wire is fixed by the clamping mechanism, so that the grinding safety is ensured.

8 Claims, 5 Drawing Sheets

(58) Field of Classification Search
CPC ....... A61B 2017/320032; A61B 2017/320072; A61B 2017/320074; A61B 2017/320075; A61B 2017/320094
USPC .................. 433/114, 131; 451/177, 259, 278
See application file for complete search history.

(56) References Cited

U.S. PATENT DOCUMENTS

| | | | | |
|---|---|---|---|---|
| 2,697,878 A * | 12/1954 | Oberley | .................. | A61C 3/06 451/450 |
| 2,857,671 A * | 10/1958 | Nelson | .................. | A61C 1/052 451/450 |
| 2,876,015 A * | 3/1959 | Steuer | ..................... | A61C 1/14 279/155 |
| 3,902,248 A * | 9/1975 | Bareth | .................... | A61C 1/14 433/129 |
| 4,155,164 A * | 5/1979 | White | .................... | A61C 7/146 219/230 |
| 4,226,054 A * | 10/1980 | Coty | .................... | A47L 7/0047 55/DIG. 18 |
| 4,281,987 A * | 8/1981 | Kleesattel | ............... | A61C 1/07 433/119 |
| 4,907,965 A * | 3/1990 | Martin | .................... | A61C 7/02 433/3 |
| 5,308,242 A * | 5/1994 | Mclaughlin | ............ | A61C 1/052 433/114 |
| 5,310,342 A * | 5/1994 | Bernstein | ................ | A61C 3/06 451/541 |
| 5,820,368 A * | 10/1998 | Wolk | .................... | A61C 7/145 433/141 |
| 10,631,963 B1 * | 4/2020 | Kumar | ................. | A61C 17/005 |
| 2001/0034533 A1 * | 10/2001 | Staehlin | ............... | A61B 17/147 606/179 |
| 2006/0068352 A1 * | 3/2006 | Young | .................... | A61C 7/02 433/157 |
| 2007/0026361 A1 * | 2/2007 | Carron | .................... | A61C 1/12 433/125 |
| 2007/0093188 A1 * | 4/2007 | Nemoto | ................. | B24B 29/02 451/285 |
| 2008/0233845 A1 * | 9/2008 | Annen | .................... | B24D 9/08 451/259 |
| 2011/0033817 A1 * | 2/2011 | McKay | .................... | A46D 1/00 433/91 |
| 2013/0203014 A1 * | 8/2013 | Lieb | ........................ | A61C 1/12 433/29 |

* cited by examiner

MEDICAL DENTAL GRINDING APPARATUS

This application is a continuation-in-part of International Application No. PCT/CN2020/109905 filed on 19 Aug. 2020 which designated the U.S. and claims priority to Chinese Application No. CN201911181473.5 filed on 27 Nov. 2019, the entire contents of each of which are hereby incorporated by reference.

Medical Dental Grinding Apparatus

TECHNICAL FIELD

The present invention relates to the technical field of medical instruments, and specifically, to a medical dental grinding apparatus.

BACKGROUND

A brace, also known as an orthodontic brace or a dental brace, is an apparatus used in orthodontics, is configured to align teeth to an appropriate occlusal position, and for improving malocclusions, including underbites, overbites, maxillary crossbites, open bites, crooked teeth or various other flaws of the teeth and jaw. The purpose of the brace is cosmetic or structural adjustment of the teeth. The brace is generally used in conjunction with other orthodontic apparatuses to widen a palate or a lower jaw and to produce a space between the teeth, or to change the appearance of the teeth and jaws. The existing brace types generally may be divided into: conventional steel braces, lingual braces (invisible braces), ceramic braces, braces without braces, self-ligating braces (steel self-ligating and ceramic self-ligating), and the like, where the steel braces are most widely used due to high cost performance. However, during use of the steel braces, the steel braces are generally secured in cooperation with steel wires, but because a notch of the steel wire is too sharp and is difficult to process, when the steel wire is used in the oral cavity, it is very easy to hurt soft tissue inside an oral cavity and cause certain harm to the oral cavity.

Therefore, to solve the problem, the invention of a medical dental grinding apparatus for grinding a metal brace or a main steel wire notch has a positive significance. Moreover, at present, such a medical dental grinding apparatus has not been reported.

SUMMARY

The purpose of the present invention is to provide a medical dental grinding apparatus for solving the problems above, so that the problem of oral soft tissue injury caused by a too sharp notch of a metal brace or steel wire is solved, and the problem of secondary injury of soft tissue inside an oral cavity is avoided by grinding the notch.

To achieve the purpose above, the present invention provides the following technical solution: a medical dental grinding apparatus, including an apparatus body, where the interior of the apparatus body is of a hollow structure, an upper end surface of the apparatus body is symmetrically provided with two holes, and a lower end surface is designed as an opening; an air pipeline, a clamping mechanism, and a grinding mechanism are provided in the apparatus body; a clamping port of the clamping mechanism extends out of the apparatus body through the opening of a lower end of the apparatus body; the grinding mechanism is located on the opening of the lower end inside the apparatus body; the air pipeline includes an air inlet pipeline, an air outlet pipeline, and a U-shaped connection pipeline; lower ports of the air inlet pipeline and the air outlet pipeline are respectively fixedly connected to two ports of the U-shaped connection pipeline, and an upper port of the air inlet pipeline (21) penetrates through one of two holes on the upper end surface of the apparatus body and that an upper port of the air outlet pipeline (22) penetrates the other of the two holes on the upper end surface of the apparatus body; an upper port of the air outlet pipeline is provided with an external thread and a silencer is threadedly connected to the upper port of the air outlet pipeline; a plane where the air pipeline is located is perpendicular to a plane where the clamping mechanism is located; the grinding mechanism includes a turbine fan rotatably provided inside the U-shaped connection pipeline and a plurality of grinding heads in transmission connection with the turbine fan; the grinding heads are all located below the U-shaped connection pipeline; and when the clamping mechanism clamps a notch part to be ground, the clamping port thereof corresponds to a position of the grinding head.

The silencer includes an inner pipeline and an outer pipeline; the inner pipeline and the outer pipeline are integrally formed; the inner pipeline includes a first air inlet and a first pipeline; the outer pipeline includes a second air inlet, a second pipeline, and an air outlet; the first pipeline is inserted into the second pipeline through the second air inlet; a plurality of air holes are provided on the first pipeline, and the interior of the inner pipeline is in communication with the interior of the outer pipeline through the plurality of air holes; an outer diameter of the first pipeline is adapted to an inner diameter of the second air inlet, and an inner diameter of the first air inlet is larger than that of the second air inlet; an internal thread is provided on the first air inlet, and is adapted to the external thread at the upper port of the air outlet pipeline.

The clamping mechanism includes a clamping part and a movable part fixedly connected to the clamping part; the clamping part includes a first clamping body, a second clamping body, and a hinge shaft; the hinge shaft penetrates through one end of the first clamping body and one end of the second clamping body, and both ends of the hinge shaft are fixed to an inner wall of the apparatus body; the movable part includes a first movable rod and a second movable rod; a lower end of the first movable rod is fixedly connected to the first clamping body, and a lower end of the second movable rod is fixedly connected to the second clamping body; push rods penetrate and extend out of the apparatus body are both fixedly connected to upper ends of the first movable rod and the second movable rod; and the first movable rod is elastically connected to the second movable rod by means of a spring.

A bump is provided at one end of the first clamping body connected to the hinge shaft, and a groove adapted to the bump is provided at one end of the second clamping body connected to the hinge shaft; the bump is provided with a first through hole, and two sidewalls of the groove are correspondingly provided with second through holes; when the first clamping body and the second clamping body are mounted in a matching mode, the first through hole and the second through holes are coaxial, the hinge shaft penetrates through the first through hole and the second through holes, and both ends of the hinge shaft are fixed to the inner wall of the apparatus body; limiting blocks are fixedly provided on the hinge shaft and are located on two sides of the groove on the second clamping body; and a diameter of the limiting block is larger than that of a second through hole.

A port at one end of the first clamping body away from the hinge shaft and a port at one end of the second clamping body away from the hinge shaft are both arc-shaped; an elastomer is provided on an arc-shaped inner side of the port, and is a sponge or rubber; the spring under a natural state enables the first clamping body and the second clamping body to be close to each other; the first clamping body and the second clamping body are both arc-shaped and are annular when the first clamping body and the second clamping body are closed; the first clamping body and the second clamping body are symmetrically arranged; and when the first clamping body and the second clamping body are closed, the ports, away from the hinge shaft, of the first clamping body and the second clamping body are closed to form an elliptical or circular through hole.

The hinge shaft is located in a U-shaped opening of the U-shaped connection pipeline, and one end of the first clamping body and one end of the second clamping body that are away from the hinge shaft are located below the U-shaped connection pipeline.

The grinding mechanism includes the turbine fan, a gear transmission assembly, and the plurality of grinding heads; the turbine fan is rotatably provided on the inner bottom of the U-shaped connection pipeline, a main rotating shaft is connected to a lower portion of the turbine fan, and a lower end of the main rotating shaft penetrates through the U-shaped connection pipeline to be connected to the gear transmission assembly; the gear transmission assembly includes a first gear, two second gears meshed with the first gear and uniformly distributed along a peripheral side of the first gear, two first bevel gears, and two second bevel gears fixed in the apparatus body by means of fixing rods and respectively meshed with the first bevel gears; an upper end of the first gear is connected to the main rotating shaft, a rotating rod is fixedly connected to a lower end, and a first grinding head is fixedly mounted at a bottom end of the rotating rod, is a concave grinding head, and is provided with a dust-storage hole; lower ends of the second gears are both connected to the first bevel gears by means of rotating shafts; the first bevel gears are meshed with the second bevel gears; a second bevel gear has an end rotatably connected to the fixing rod fixed in the apparatus body, and the other end fixedly connected to a grinding head rod; a top end of the grinding head rod is provided with a second grinding head, a radius of a top end of the second grinding head is smaller than a root radius thereof, and the top end of the second grinding head is provided with a dust-storage hole; and the second grinding head is located 0.2-0.5 mm below the first grinding head.

A central axis of the rotating rod is parallel to that of the rotating shaft, and an angle of 60-80° is formed between the central axis of the rotating shaft and a central axis of the corresponding grinding head rod.

Compared with the prior art, the beneficial effects of the present invention are as follows: the medical dental grinding apparatus is provided; the turbine fan is driven by high-pressure air entering the air pipeline to rotate, so that power is provided for the gear transmission assembly to drive the grinding head to work, and a hidden danger of electric leakage caused by using an electric apparatus in a fragile oral environment is avoided; a steel wire is fixed by means of the clamping mechanism during use of the apparatus of the present invention, so that the grinding safety is ensured, and precise grinding is implemented; the concave first grinding head and the plurality of grinding heads II may effectively remove a sharp cross section on the notch of the steel wire in different directions, so that oral health of a user is protected; when an airflow flows out through the air outlet pipeline, the airflow needs to flow into the interior of the outer pipeline through the air holes uniformly distributed on the first pipeline, the configuration of the air holes implements a turbulent effect on a flow direction of the airflow entering the first pipeline, and the airflow is prevented from rushing, so that noise is greatly reduced. The present invention is simple in structure, high in maneuverability, and suitable for grinding a notch of a metal brace or main steel wire in an oral cavity.

Figure 1:
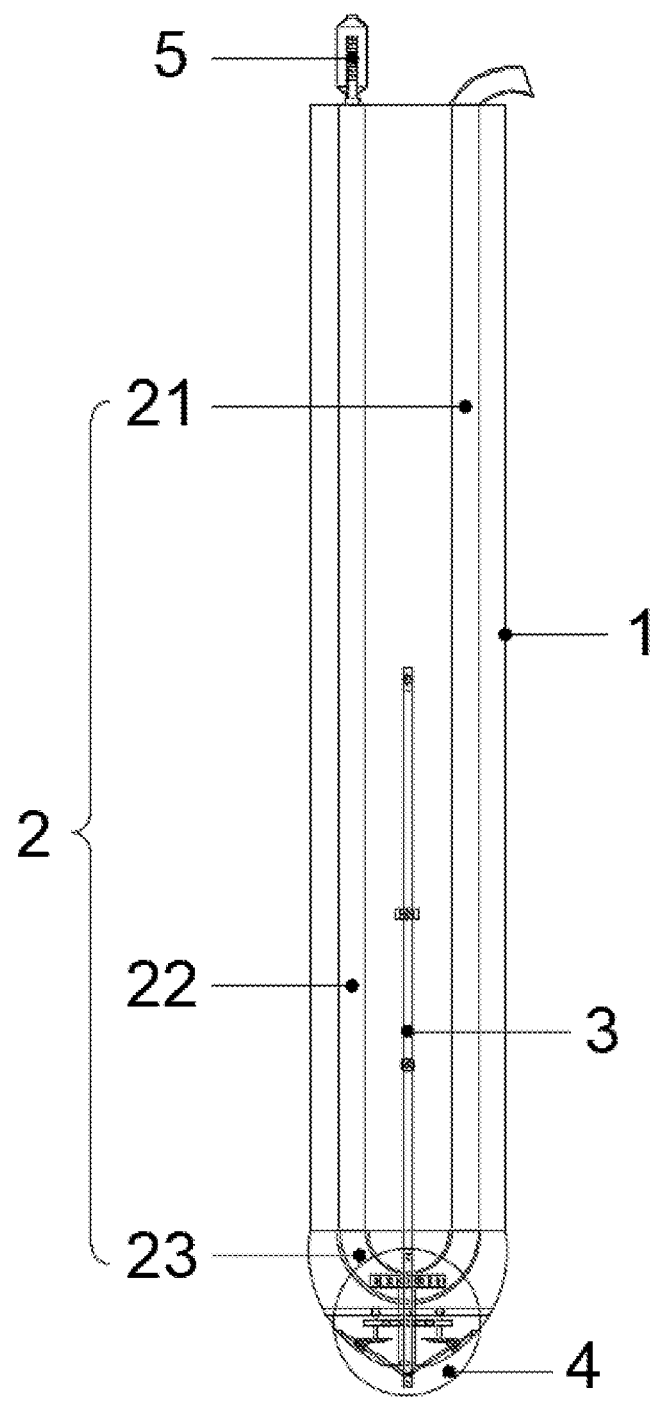
FIG. 1 is a front view of a medical dental grinding apparatus according to the present invention.

DESCRIPTION OF REFERENCE NUMERALS 1-apparatus body; 2-air pipeline; 21-air inlet pipeline; 22-air outlet pipeline; 23-U-shaped connection pipeline; 3-clamping mechanism; 31-clamping body I; 32-second clamping body; 33-hinge shaft; 331-limiting block; 34-first movable rod; 35-second movable rod; 36-push rod; 37-spring; 4-grinding mechanism; 41-turbine fan; 411-main rotating shaft; 42-first gear; 421-rotating rod; 43-gear II; 431-rotating shaft; 44-bevel gear I; 45-bevel gear II; 451-grinding head rod; 5-silencer; 51-inner pipeline; 511-first air inlet; 512-first pipeline; 52-outer pipeline; 521-second air inlet; 522-second pipeline; 523-air outlet; 6-fixing rod.

DETAILED DESCRIPTION

The technical solutions of the present invention are clearly and fully described below with reference to embodiments of the present invention. Apparently, the described embodiments are merely some of the embodiments of the present invention, but not all the embodiments. Based on the embodiments of the present invention, all other embodiments obtained by a person of ordinary skill in the art without involving an inventive effort shall fall within the scope of protection of the present invention.

Figure 2:
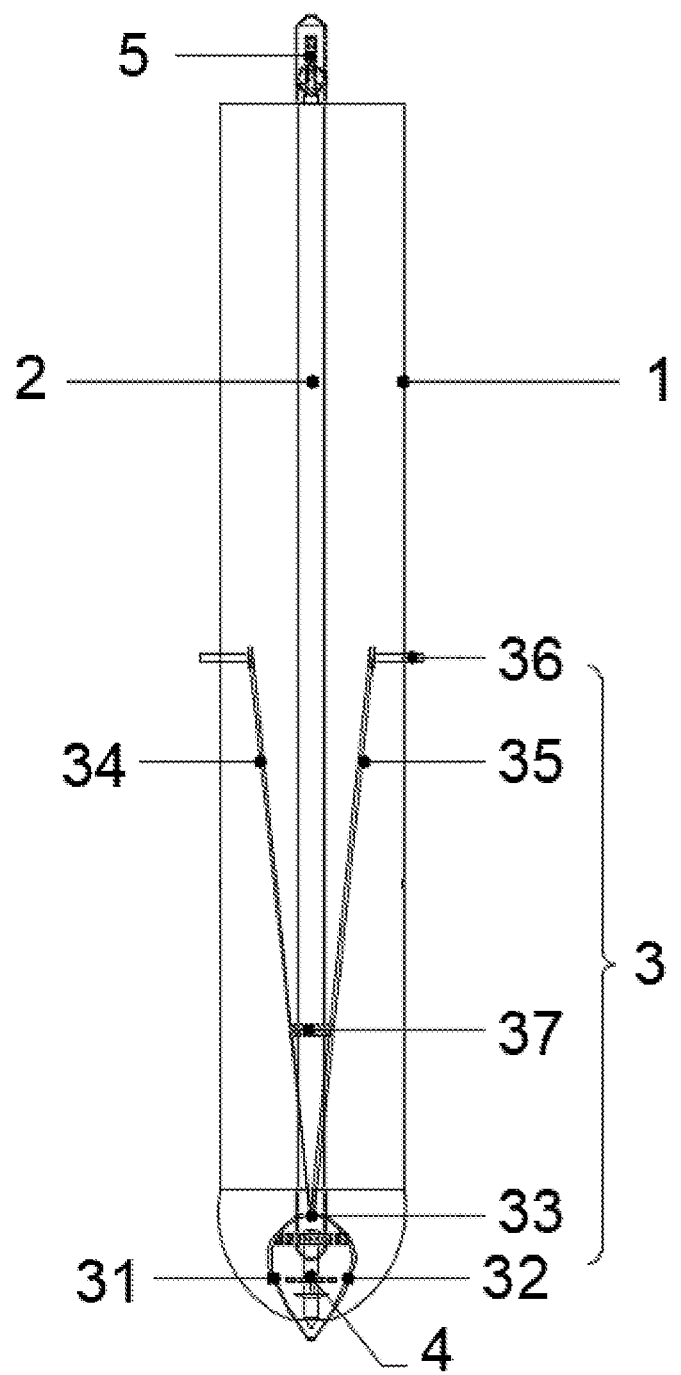
FIG. 2 is a left view of a medical dental grinding apparatus according to the present invention.
Figure 3:
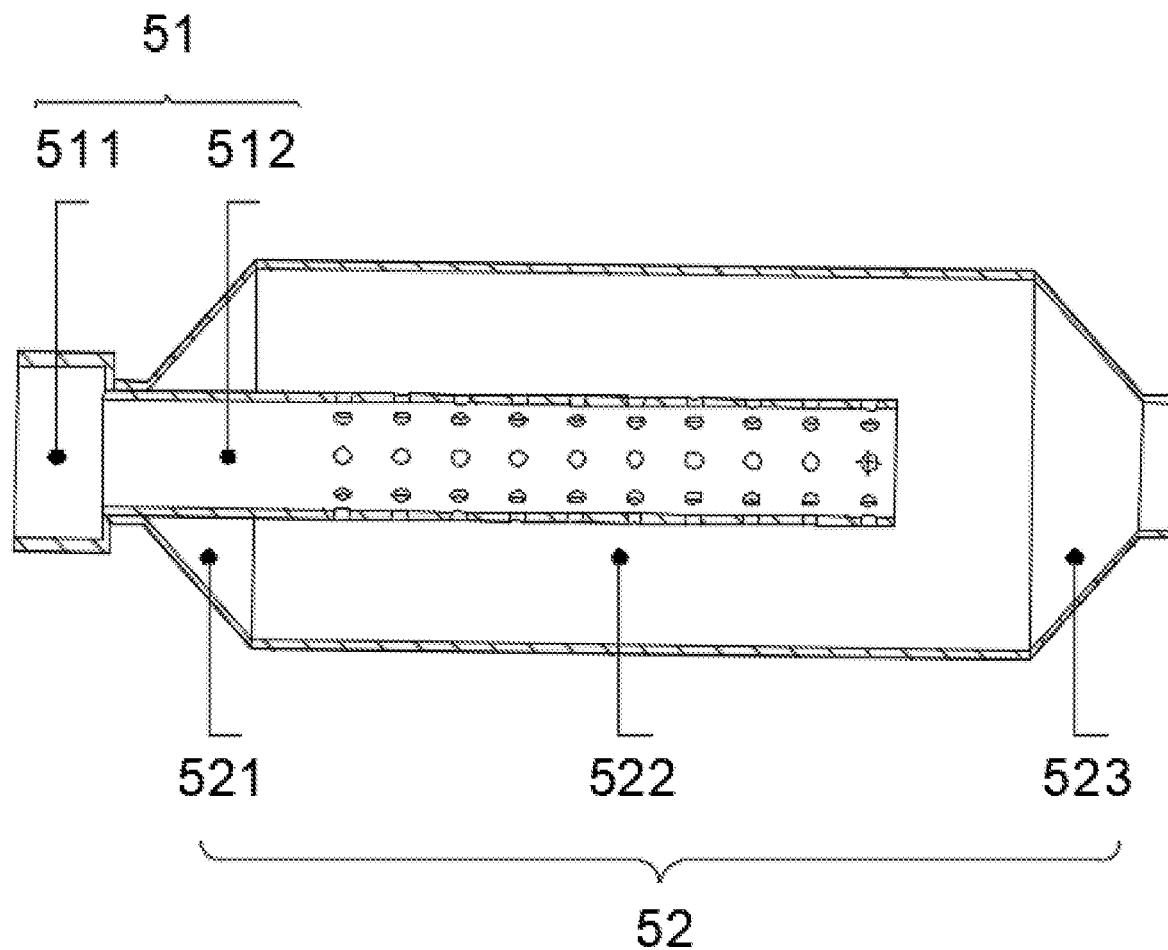
FIG. 3 is a schematic structural diagram of a silencer 5 according to FIG. 1 of the present invention.
Figure 4:
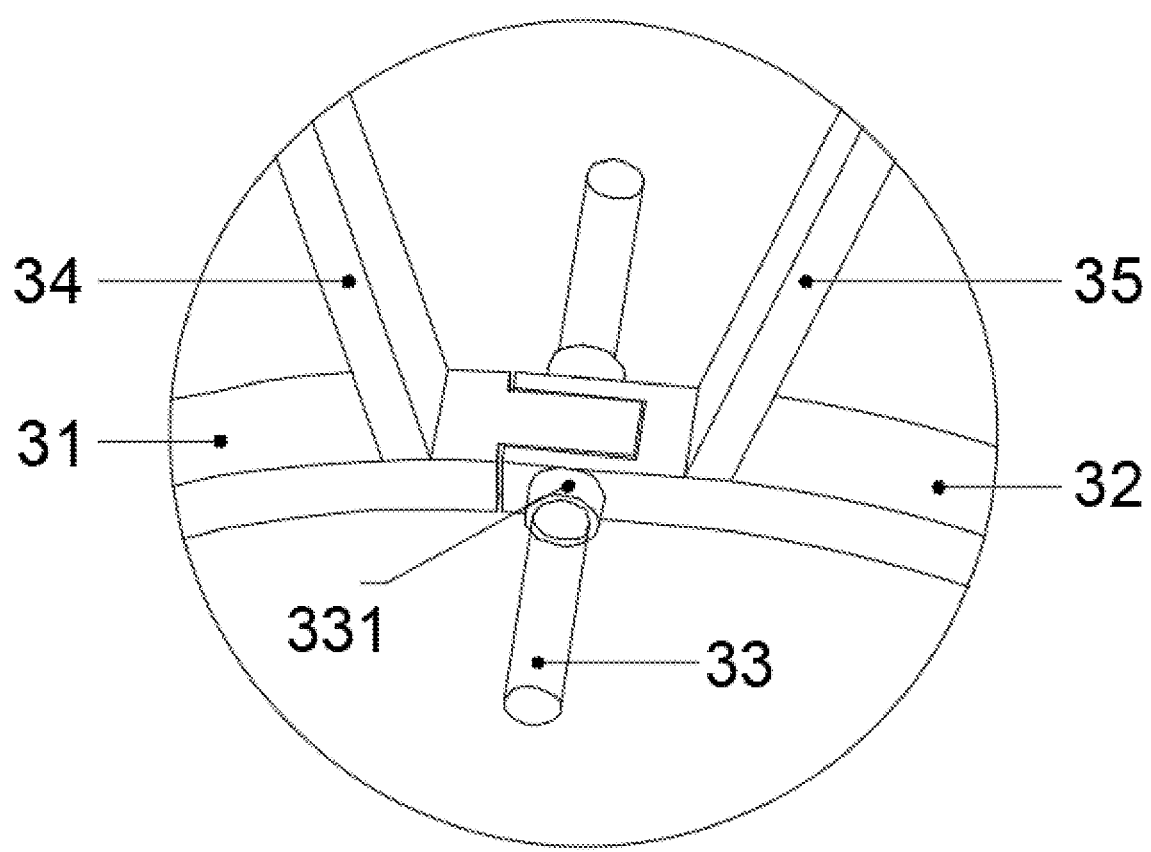
FIG. 4 is a schematic structural diagram of mounting among a first clamping body 31, a second clamping body 32, and a hinge shaft 33 according to the present invention.
Figure 5:
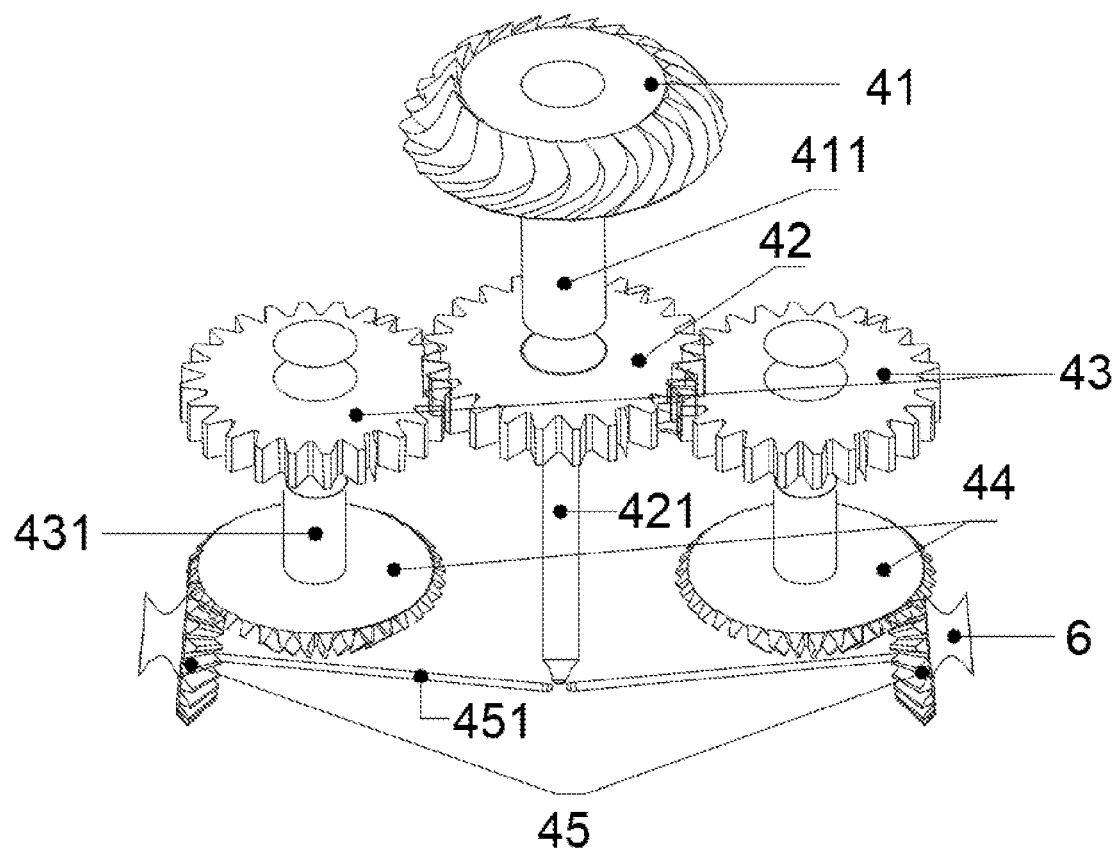
FIG. 5 is a schematic structural diagram of a grinding mechanism 4 according to FIG. 1 of the present invention.

A medical dental grinding apparatus provided in the present invention includes, as shown in FIGS. 1 and 2, an apparatus body 1, where the interior of the apparatus body 1 is of a hollow structure, an upper end surface of the apparatus body 1 is symmetrically provided with two holes, and a lower end surface is designed as an opening. An air pipeline 2, a clamping mechanism 3, and a grinding mechanism 4 are provided in the apparatus body 1. The grinding mechanism 4 is provided below the air pipeline 2, and the air pipeline 2 and the grinding mechanism 4 are in a same plane which is perpendicular to a plane where the clamping mechanism 3 is located. The air pipeline 2 includes an air inlet pipeline 21, an air outlet pipeline 22, and a U-shaped connection pipeline 23. Lower ports of the air inlet pipeline 21 and the air outlet pipeline 22 are respectively fixedly connected to two ports of the U-shaped connection pipeline 23, and an upper port of the air inlet pipeline (21) penetrates through one of the two holes on the upper end surface of the apparatus body 1 and that an upper port of the air outlet pipeline (22) penetrates the other of the two holes on the upper end surface of the apparatus body 1. An upper port of the air outlet pipeline 22 is provided with an external thread and a silencer 5 is threadedly connected to the upper port of the air outlet pipeline 22. The silencer 5 includes an inner pipeline 51 and an outer pipeline 52, where the inner pipeline 51 and the outer pipeline 52 are integrally formed. The inner pipeline 51 includes an first air inlet 511 and a first pipeline 512 which are connected to each other. The outer pipeline 52 includes an second air inlet 521, a second pipeline 522, and an air outlet 523 which are connected to each other. The second air inlet 521 is flared, and an inner diameter of a front-end opening is smaller than an outer diameter of the first air inlet 511 and larger than an outer diameter of the first pipeline 512. A head end of the first pipeline 512 is in communication with the first air inlet 511, and a tail end is closed. The first pipeline 512 is inserted into the second pipeline 522 through the second air inlet 521. A plurality of air holes are provided on the first pipeline 512, and the interior of the inner pipeline 51 is in communication with the interior of the outer pipeline 52 through the plurality of air holes. The outer diameter of the first pipeline 512 is adapted to an inner diameter of the second air inlet 521, and an inner diameter of the first air inlet 511 is larger than that of the second air inlet 521. An internal thread is provided on the first air inlet 511, and is adapted to the external thread at the upper port of the air outlet pipeline 22. An airflow passes through the U-shaped connection pipeline 23 from the air inlet pipeline 21 and then enters the silencer 5 from the port of the air outlet pipeline 22; after entering the first pipeline 512 from the first air inlet 511 of the inner pipeline 51, the airflow flows into the interior of the second pipeline 522 of the outer pipeline 52 along the plurality of air holes on the first pipeline 512, and then flows out of the air outlet 523 of the outer pipeline 52. After the airflow passes through the air holes uniformly distributed on the first pipeline 512, noise is greatly reduced, a turbulent effect on a flow direction of the airflow entering the first pipeline 512 of the inner pipeline 51 is implemented, and the airflow is prevented from rushing, so that a silencing effect is good.

The clamping mechanism 3 includes a clamping part and a movable part fixedly connected to the clamping part. The clamping part includes a first clamping body 31, a second clamping body 32, and a hinge shaft 33. The hinge shaft 33 penetrates through one end of the first clamping body 31 and one end of the second clamping body 32, and both ends of the hinge shaft 33 are fixed to an inner wall of the apparatus body 1. A bump is provided at one end of the first clamping body 31 connected to the hinge shaft 33, and a groove adapted to the bump is provided at one end of the second clamping body 32 connected to the hinge shaft 33. The bump is provided with a first through hole, and two sidewalls of the groove are correspondingly provided with second through holes. When the first clamping body 31 and the second clamping body 32 are mounted in a matching mode, the first through hole and the second through holes are coaxial, the hinge shaft 33 penetrates through the first through hole and the second through holes, and both ends of the hinge shaft 33 are fixed to the inner wall of the apparatus body 1. Limiting blocks 331 are fixedly provided on the hinge shaft 33, are located on two sides of the groove on the second clamping body 32, and have a function of fixing a position of the clamping mechanism, thereby preventing the first clamping body 31 and the second clamping body 32 from moving on the hinge shaft 33. A port at one end of the first clamping body 31 away from the hinge shaft 33 and a port at one end of the second clamping body 32 away from the hinge shaft 33 are both arc-shaped, the ports of the first clamping body 31 and the second clamping body 32 extend out of the apparatus body through the opening of a lower end of the apparatus body 1, and an elastomer is provided inside the arc-shaped ports and is a sponge or rubber. The first clamping body 31 and the second clamping body 32 are both arc-shaped and are annular as a whole when the first clamping body 31 and the second clamping body 32 are closed. The first clamping body 31 and the second clamping body 32 are symmetrically arranged, the arc-shaped ports, away from the hinge shaft 33, of the first clamping body 31 and the second clamping body 32 are closed to form an elliptical or circular through hole, and a steel wire is fixed by means of the elastomer inside the elliptical or circular through hole, so as to ensure safety when using the apparatus. The hinge shaft 33 is located in a U-shaped opening of the U-shaped connection pipeline 23, and one end of the first clamping body 31 and one end of the second clamping body 32 that are away from the hinge shaft 33 are located below the U-shaped connection pipeline 23. The movable part includes a first movable rod 34 and a second movable rod 35, a lower end of the first movable rod 34 is fixedly connected to the first clamping body 31, and a lower end of the second movable rod 35 is fixedly connected to the second clamping body 32. Push rods 36 penetrate and extend out of the apparatus body 1 are both fixedly connected to upper ends of the first movable rod 34 and the second movable rod 35. Middle portions of the first movable rod 34 and the second movable rod 35 are elastically connected by means of a spring 37. The spring 37 under a natural state enables the first clamping body 31 and the second clamping body 32 to be close to each other. The apparatus body 1 is held by a hand, and by pressing the push rods 36, the first clamping body 31 is separated from the second clamping body 32 for clamping the steel wire; in this case, the spring 37 is in a compressed state, after the steel wire is clamped, the push rods 36 are loosened, the spring 37 restores to the natural state, and the first clamping body 31 and the second clamping body 32 are close to each other to clamp the steel wire.

The grinding mechanism 4 includes the turbine fan 41, a gear transmission assembly, and a plurality of grinding heads. A fixing plate for fixing the grinding mechanism 4 is provided in the apparatus body 1. The turbine fan 41 is rotatably provided on the inner bottom of the U-shaped connection pipeline 23, a main rotating shaft 411 is connected to a lower portion of the turbine fan 41, and a lower end of the main rotating shaft 411 penetrates through the U-shaped connection pipeline 23 and the fixing plate to be connected to the gear transmission assembly. The gear transmission assembly includes a first gear 42, two second gears 43 meshed with the first gear 42 and uniformly distributed along a peripheral side of the first gear 42, two first bevel gears 44, and two second bevel gears 45 fixed in the apparatus body 1 by means of fixing rods 6 and respectively meshed with the first bevel gears 44. An upper end of the first gear 42 is connected to the main rotating shaft 411, a rotating rod 421 is fixedly connected to a lower end, and a first grinding head is fixedly mounted at a bottom end of the rotating rod 421, is a concave grinding head, and is provided with a dust-storage hole. Upper ends of the second gears 43 are rotatably fixed to the fixing plate, and lower ends are both connected to the first bevel gears 44 by means of rotating shafts 431. The first bevel gears 44 are meshed with the second bevel gears 45. The bevel gear II 45 has an end rotatably connected to the fixing rod 6 fixed in the apparatus body 1, and the other end fixedly connected to a grinding head rod 451. A top end of the grinding head rod 451 is provided with a second grinding head, a radius of a top end of the second grinding head is smaller than a root radius thereof, and the top end of the second grinding head is provided with a dust-storage hole. The second grinding head is located 0.2-0.5 mm below the first grinding head. A central axis of the rotating rod 421 is parallel to that of the rotating shaft 431, and an angle of 60-80° is formed between the central axis of the rotating shaft 431 and a central axis of the corresponding grinding head rod 451. The turbine fan 41 is driven by high-pressure air to rotate, so that the first gear 42 connected to the turbine fan 41 by means of the main rotating shaft 411 operates, the operation of the first gear 42 drives the rotating rod 421 to rotate, and the first grinding head fixedly mounted at a bottom end of the rotating rod 421 starts grinding; meanwhile, the two second gears 43 meshed with the first gear 42 both start rotating, and the first bevel gears 44 connected to the lower ends of the second gears 43 by means of the rotating shaft 431 also start operating; at the same time, the second bevel gears 45 meshed with the first bevel gears 44 operate, the operation of the second bevel gears 45 drives the grinding head rod 451 fixedly connected to the second bevel gears 45 to rotate, and the second grinding head provided on the top end of the grinding head rod 451 starts grinding.

According to the present invention, during use of the medical dental grinding apparatus, the high-pressure air is introduced into the air inlet pipeline 21; the apparatus body 1 is held by a hand, and by pressing the push rods 36, the first clamping body 31 is separated from the second clamping body 32 for clamping the steel wire having a notch; in this case, the spring 37 is in a compressed state, after the steel wire is clamped, the push rods 36 are loosened, the spring 37 restores to the natural state, and the first clamping body 31 and the second clamping body 32 are close to each other to clamp the steel wire. The turbine fan 41 in the U-shaped connection pipeline 23 is driven by the high-pressure air to operate, so that the first gear 42 connected to the turbine fan 41 by means of the main rotating shaft 411 operates, the operation of the first gear 42 drives the rotating rod 421 to rotate, and the first grinding head fixedly mounted at the bottom end of the rotating rod 421 starts grinding; meanwhile, the two second gears 43 meshed with the first gear 42 both start rotating, and the first bevel gears 44 connected to the lower ends of the second gears 43 by means of the rotating shaft 431 also start operating; at the same time, the second bevel gears 45 meshed with the first bevel gears 44 operate, the operation of the second bevel gears 45 drives the grinding head rod 451 fixedly connected to the second bevel gears 45 to rotate, and the second grinding head provided at the top end of the grinding head rod 451 starts grinding. Grinding is performed on the steel wire having the notch so that the steel wire is smooth, and the problem of oral soft tissue injury caused by a too sharp notch is avoided.

Although the embodiments of the present invention are shown and described, it may be understood by a person of ordinary skill in the art that various changes, modifications, substitutions, and variations may be performed on these embodiments without departing from the principle and spirit of the present invention. The scope of protection of the present invention is defined by appended claims and equivalents thereof.

What is claimed is:

1. A medical dental grinding apparatus, comprising an apparatus body (1), wherein the interior of the apparatus body (1) is of a hollow structure, an upper end surface of the apparatus body (1) is symmetrically provided with two holes, and a lower end surface is designed as an opening; an air pipeline (2), a clamping mechanism (3), and a grinding mechanism (4) are provided in the apparatus body (1); a clamping port of the clamping mechanism (3) extends out of the apparatus body (1) through the opening of a lower end of the apparatus body (1); the grinding mechanism (4) is located on the opening of the lower end inside the apparatus body (1); the air pipeline (2) comprises an air inlet pipeline (21), an air outlet pipeline (22), and a U-shaped connection pipeline (23); lower ports of the air inlet pipeline (21) and the air outlet pipeline (22) are respectively fixedly connected to two ports of the U-shaped connection pipeline (23), and an upper port of the air inlet pipeline (21) penetrates through one of the twos holes on the upper end surface of the apparatus body (1) and that an upper port of the air outlet pipeline (22) penetrates the other of the two holes on the upper end surface of the apparatus body (1); an upper port of the air outlet pipeline (22) is provided with an external thread and a silencer (5) is threadedly connected to the upper port of the air outlet pipeline (22); a plane where the air pipeline (2) is located is perpendicular to a plane where the clamping mechanism (3) is located; the grinding mechanism (4) comprises a turbine fan (41) rotatably provided inside the U-shaped connection pipeline (23) and a plurality of grinding heads in transmission connection with the turbine fan; the grinding heads are all located below the U-shaped connection pipeline (23); and when the clamping mechanism (3) clamps a notch part to be ground, the clamping port thereof corresponds to a position of the grinding head.

2. The medical dental grinding apparatus according to claim 1, wherein the silencer (5) comprises an inner pipeline (51) and an outer pipeline (52); the inner pipeline (51) and the outer pipeline (52) are integrally formed; the inner pipeline (51) comprises a first air inlet (511) and a first pipeline (512); the outer pipeline (52) comprises a second air inlet (521), a second pipeline (522), and an air outlet (523); the first pipeline (512) is inserted into the second pipeline (522) through the second air inlet (521); a plurality of air holes are provided on the first pipeline (512), and the interior of the inner pipeline (51) is in communication with the interior of the outer pipeline (52) through the plurality of air holes; an outer diameter of the first pipeline (512) is adapted to an inner diameter of the second air inlet (521), and an inner diameter of the first air inlet (511) is larger than that of the second air inlet (521); an internal thread is provided on the first air inlet (511), and is adapted to the external thread at the upper port of the air outlet pipeline (22).

3. The medical dental grinding apparatus according to claim 1, wherein the clamping mechanism (3) comprises a clamping part and a movable part fixedly connected to the clamping part; the clamping part comprises a first clamping body (31), a second clamping body (32), and a hinge shaft (33); the hinge shaft (33) penetrates through one end of the first clamping body (31) and one end of the second clamping body (32), and both ends of the hinge shaft (33) are fixed to an inner wall of the apparatus body (1); the movable part comprises a first movable rod (34) and a second movable rod (35); a lower end of the first movable rod (34) is fixedly connected to the first clamping body (31), and a lower end of the second movable rod (35) is fixedly connected to the second clamping body (32); push rods (36) penetrate and extend out of the apparatus body (1) are both fixedly connected to upper ends of the first movable rod (34) and the second movable rod (35); and the first movable rod (34) is elastically connected to the second movable rod (35) by means of a spring (37).

4. The medical dental grinding apparatus according to claim 3, wherein a bump is provided at one end of the first clamping body (31) connected to the hinge shaft (33), and a groove adapted to the bump is provided at one end of the second clamping body (32) connected to the hinge shaft (33); the bump is provided with a first through hole, and two sidewalls of the groove are correspondingly provided with second through holes; when the first clamping body (31) and the second clamping body (32) are mounted in a matching mode, the first through hole and the second through holes are coaxial, the hinge shaft (33) penetrates through the first through hole and the second through holes, and both ends of the hinge shaft (33) are fixed to the inner wall of the apparatus body (1); limiting blocks (331) are fixedly provided on the hinge shaft (33) and are located on two sides of the groove on the second clamping body (32); and a diameter of the limiting block (331) is larger than that of the second through holes.

5. The medical dental grinding apparatus according to claim 4, wherein a port at one end of the first clamping body (31) away from the hinge shaft (33) and a port at one end of the second clamping body (32) away from the hinge shaft (33) are both arc-shaped; an elastomer is provided on an arc-shaped inner side of the port, and is a sponge or rubber; the spring (37) under a natural state enables the first clamping body (31) and the second clamping body (32) to be close to each other; the first clamping body (31) and the second clamping body (32) are both arc-shaped and are annular when the first clamping body (31) and the second clamping body (32) are closed; the first clamping body (31) and the second clamping body (32) are symmetrically arranged; and when the first clamping body (31) and the second clamping body (32) are closed, the ports, away from the hinge shaft (33), of the first clamping body (31) and the second clamping body (32) are closed to form an elliptical or circular through hole.

6. The medical dental grinding apparatus according to claim 3, wherein the hinge shaft (33) is located in a U-shaped opening of the U-shaped connection pipeline (23), and one end of the first clamping body (31) and one end of the second clamping body (32) that are away from the hinge shaft (33) are located below the U-shaped connection pipeline (23).

7. The medical dental grinding apparatus according to claim 1, wherein the grinding mechanism (4) comprises the turbine fan (41), a gear transmission assembly, and a plurality of grinding heads; the turbine fan (41) is rotatably provided on the inner bottom of the U-shaped connection pipeline (23), a main rotating shaft (411) is connected to a lower portion of the turbine fan (41), and a lower end of the main rotating shaft (411) penetrates through the U-shaped connection pipeline (23) to be connected to the gear transmission assembly; the gear transmission assembly comprises a first gear (42), two second gears (43) meshed with the first gear (42) and uniformly distributed along a peripheral side of the first gear (42), two first bevel gears (44), and two second bevel gears (45) fixed in the apparatus body (1) by means of fixing rods (6) and respectively meshed with the first bevel gears (44); an upper end of the first gear (42) is connected to the main rotating shaft (411), a rotating rod (421) is fixedly connected to a lower end, and a first grinding head is fixedly mounted at a bottom end of the rotating rod (421), is a concave grinding head, and is provided with a dust-storage hole; lower ends of the two second gears (43) are both connected to the first bevel gears (44) by means of rotating shafts (431); the first bevel gears (44) are meshed with the second bevel gears (45); a second bevel gear (45) has an end rotatably connected to the fixing rod (6) fixed in the apparatus body (1), and the other end fixedly connected to a grinding head rod (451); a top end of the grinding head rod (451) is provided with a second grinding head, a radius of a top end of the second grinding head is smaller than a root radius thereof, and the top end of the second grinding head is provided with a dust-storage hole; and the second grinding head is located 0.2-0.5 mm below the first grinding head.

8. The medical dental grinding apparatus according to claim 7, wherein a central axis of the rotating rod (421) is parallel to that of the rotating shaft (431), and an angle of 60-80° is formed between the central axis of the rotating shaft (431) and a central axis of the corresponding grinding head rod (451).

* * * * *